Sept. 30, 1969  V. A. RIDDELL  3,469,321

SPLINE GAUGE

Filed Oct. 19, 1967

INVENTOR.
VERNON A. RIDDELL
BY
Barnes, Kisselle, Raisch & Choate
ATTORNEYS

United States Patent Office 3,469,321
Patented Sept. 30, 1969

3,469,321
SPLINE GAUGE
Vernon A. Riddell, Farmington, Mich., assignor to Vinco Corporation, Detroit, Mich., a corporation of Michigan
Filed Oct. 19, 1967, Ser. No. 676,494
Int. Cl. G01b 3/14
U.S. Cl. 33—179.5                         4 Claims

ABSTRACT OF THE DISCLOSURE

A spline gauge having a pair of telescoping members each of which has circumferentially spaced spline engaging teeth thereon. A nut engages threads on each of the members, the number of threads per inch differing on each of the members, so that when the nut is rotated, one of the members is moved axially relative to the other of the members. The members are interconnected so that when they are moved axially relative to one another, rotation of the members occurs to cause the teeth thereon to rotate relative to one another and thereby engage the opposite sides of the teeth of a spline to be gauged. Indicia on the gauge indicate the tooth thickness. After the gauge has been engaged with the spline, a portion thereof can be used to measure concentricity of the spline.

This invention relates to spline guages and particularly to gauges which can be used for measuring tooth thickness and concentricity of splines.

BACKGROUND OF THE INVENTION

The invention is directed to measuring splines for tooth thickness and concentricity by utilizing the principle of the gauge shown in the patent to Stapleton 2,849,802, issued Sept. 2, 1958.

Among the objects of the invention are to provide a spline gauge which is accurate, relatively simple, does not incorporate springs, will directly indicate tooth thickness without the use of a dial indicator and can be used for measuring concentricity with the use of a dial indicator.

SUMMARY

Basically, the spline gauge embodying the invention comprises a pair of telescoping members each of which has circumferentially spaced spline engaging teeth thereon. A nut engages threads on each of the members, the number of threads per inch differing on each of the members, so that when the nut is rotated, one of the members is moved axially relative to the other of the members. A radially extending pin and helical slot interconnect the members so that when they are moved axially relative to one another, rotation of the members occurs to cause the teeth thereon to rotate relative to one another and thereby engage the opposite sides of the teeth of a spline to be gauged. Indicia on the gauge indicate the tooth thickness. After the gauge has been engaged with the spline, a portion thereof can be used to measure concentricity of the spline.

DESCRIPTION

Figure 1:
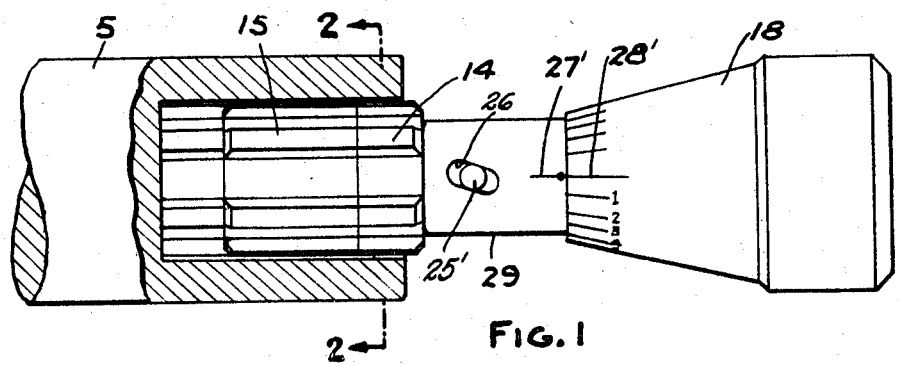
FIG. 1 is a part sectional elevational view of the gauge embodying the invention shown in position for measuring a spline to be gauged.
Figure 3:
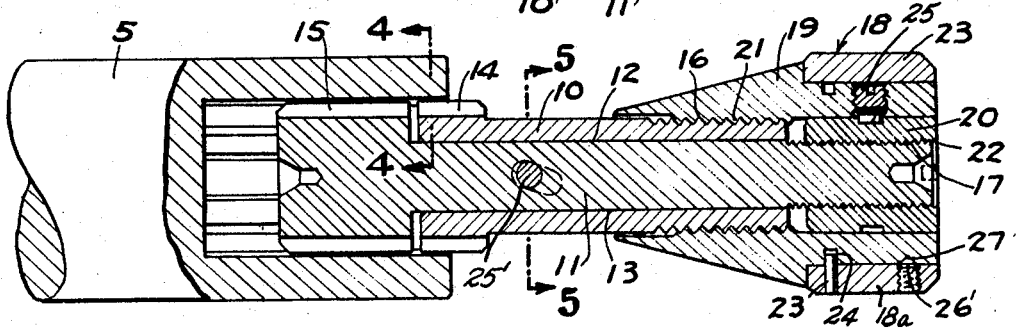
FIG. 3 is a fragmentary view similar to FIG. 1 showing the parts in a different operative position.

Referring to FIGS. 1 and 3, the spline gauge embodying the invention comprises a pair of telescoping members 10, 11 that have complementary accurately formed concentric internal and external surfaces 12, 13, respectively. Each of the members 10, 11 is formed with circumferentially spaced involute teeth 14, 15 on one end thereof. These teeth are positioned and shaped to function in the manner set forth in the prior patent to Stapleton 2,849,802, issued Sept. 2, 1958.

The other end of each of the members 10, 11 is formed with external threads 16, 17, respectively. A differential nut 18 comprises a first portion or section 19 and a second portion or section 20 whch have complementary threads 21, 22 that engage the threads 16, 17, respectively. The number of threads 16, is less than the number of threads 17, so that when the nut 18 is rotated member 11 will be moved axially relative to member 10. For example, the number of threads 16 per inch may be twenty-one and the number of threads 17 per inch may be twenty-two. As shown in FIG. 3, a slip ring 18a surrounds the section 19 of nut 18 and is locked axially with respect to section 19 by three equally spaced pins 23 that engage an annular retainer groove 24. A set screw 25 locks sections 19 and 20 together. A spring loaded detent ball 26' in ring 18a engages a groove 27 in section 19 to provide a friction connection.

Figure 5:
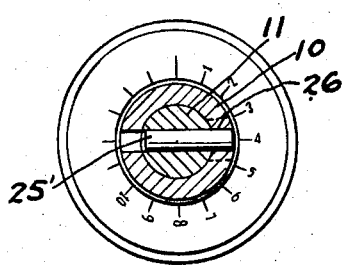
FIG. 5 is a sectional view taken along the line 5—5 in FIG. 3.

As shown in FIG. 5, the inner member 11 is provided with a diametrically extending pin 25' which projects radially outwardly into a helical slot 26 in the outer member 10. By this arrangement, when the nut 18 is rotated and in turn the members 10, 11 are moved axially relative to one another, a relative rotation is obtained between the members 10, 11 and in turn between teeth 14, 15.

As shown in FIG. 1, when the teeth 14, 15 are axially aligned their adjacent ends substantially abut one another. Also, as shown in FIG. 1, indicia 27', 28' are provided on the outer surface 29 and the adjacent edge of the nut 18, respectively.

Figure 2:
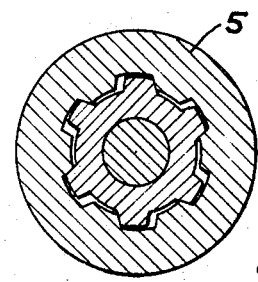
FIG. 2 is a sectional view taken alone the line 2—2 in FIG. 1.
Figure 4:
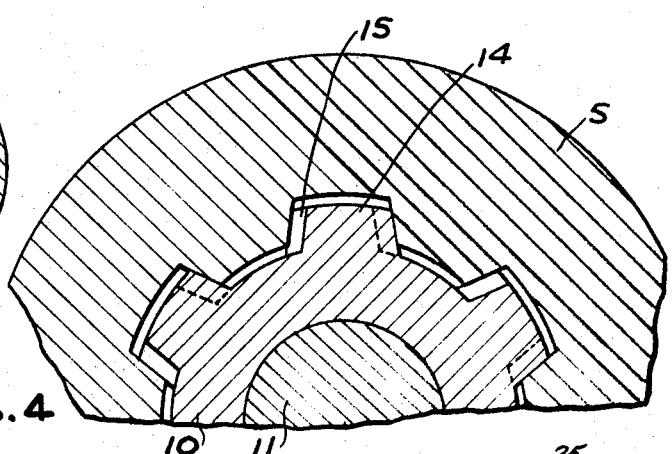
FIG. 4 is a fragmentary sectional view on a large scale taken along the line 4—4 in FIG. 3.

In use, when the gauge is to be used for gauging a spline S, it is moved axially into position as shown in FIGS. 1 and 2 and the nut 18 is rotated by turning ring 18a to translate the members 10, 11 relative to one another and thereby rotate the teeth 14, 15 causing the teeth 14 to engage one side of the teeth of the spline and the teeth 15 to engage the other side of the teeth of the spline as shown in FIG. 4. This will result in a displacement of indicia 27', 28' to give an indication of tooth thickness of the spline teeth. As the teeth engage ring 18a will slip relative to nut 18. This insures reproducible results.

When the gauge is in this position, the outer surface 29 of the member 10 can be used as a reference surface for gauging the concentricity of the spline teeth. By bringing a dial indicator into engagement with the surface 29 and rotating the splines while it is supported in a V block, the concentricity of the spline can be determined.

It can be appreciated that the spline gauge can be made to gauge external splines by providing teeth that extend radially inwardly on the ends of the members 10, 11 in the manner contemplated by the Stapleton Patent 2,849,802.

I claim:
1. In a spline gauge, the combination comprising
  a pair of coaxial relatively rotatable members, each said member having spline engaging teeth circumferentially spaced thereon, said teeth of said members being axially aligned in one position of said members, means for translating one of said members axially relative to the other of said member, said means for causing axial movement of one of said members relative to the other of said members comprising a nut, interengaging threads between said nut and one of said members, interengaging threads between said nut and said other of said members, the number of threads per inch on one member differing from the number of threads per inch on the other member, means responsive to said axial movement for causing rotation of one of said members relative to the other of said members comprising a pin extending radially from one of said members, the other of said members having a slot inclined to the axis thereof into which said pin extends, indicia means on said nut and on one of said members, said indicia means being rotationally displaced to provide a visual indication of the relative rotational movement of said members.

2. The combination set forth in claim 1 wherein said nut comprises two separable members, each of which has one of said threads thereon.

3. The combination set forth in claim 1 wherein said members are telescoped internally relative to one another and said teeth are provided on one end of said members and said threads are provided on the other end of said members.

4. The combination set forth in claim 1 wherein one of said members has an accurately formed cylindrical surface which is usable for checking concentricity of a spline.

References Cited

UNITED STATES PATENTS

| | | |
|---|---|---|
| 1,311,548 | 7/1919 | Blush. |
| 1,874,517 | 8/1932 | Hartness. |
| 2,445,184 | 7/1948 | Parker et al. |
| 2,665,136 | 1/1954 | Fallon. |
| 2,665,490 | 1/1954 | Zelnick. |

FOREIGN PATENTS 5,080    1900    Great Britain.

SAMUEL S. MATTHEWS, Primary Examiner